United States Patent
Masuda et al.

(10) Patent No.: US 9,429,487 B2
(45) Date of Patent: Aug. 30, 2016

(54) MAGNETIC LOAD SENSOR UNIT FOR USE IN A LINEAR MOTION ACTUATOR, AND LINEAR MOTION ACTUATOR

(71) Applicants: Yui Masuda, Shizuoka (JP); Tatsuya Yamasaki, Shizuoka (JP); Makoto Muramatsu, Shizuoka (JP)

(72) Inventors: Yui Masuda, Shizuoka (JP); Tatsuya Yamasaki, Shizuoka (JP); Makoto Muramatsu, Shizuoka (JP)

(73) Assignee: NTN CORPORATION, Osaka (JP)

( * ) Notice: Subject to any disclaimer, the term of this patent is extended or adjusted under 35 U.S.C. 154(b) by 99 days.

(21) Appl. No.: 14/350,107

(22) PCT Filed: Oct. 2, 2012

(86) PCT No.: PCT/JP2012/075491
§ 371 (c)(1),
(2) Date: Apr. 7, 2014

(87) PCT Pub. No.: WO2013/054695
PCT Pub. Date: Apr. 18, 2013

(65) Prior Publication Data
US 2014/0283635 A1 Sep. 25, 2014

(30) Foreign Application Priority Data
Oct. 11, 2011 (JP) .................................. 2011-223704

(51) Int. Cl.
*G01L 1/12* (2006.01)
*F16D 65/18* (2006.01)
(Continued)

(52) U.S. Cl.
CPC .............. *G01L 1/122* (2013.01); *B60T 13/741* (2013.01); *F16C 19/10* (2013.01); *F16C 19/522* (2013.01);
(Continued)

(58) Field of Classification Search
CPC ...... G01L 1/12; G01L 5/0009; F16C 19/522; F16C 41/007
USPC ......................... 73/862.193, 862.322, 862.69
See application file for complete search history.

(56) References Cited

U.S. PATENT DOCUMENTS 5,134,923 A * 8/1992 Wexler .................. F16K 5/0647
74/99 A
5,788,023 A 8/1998 Schöner et al.
(Continued)

FOREIGN PATENT DOCUMENTS

EP 2 431 628 3/2012
JP 58-201041 11/1983
(Continued)

OTHER PUBLICATIONS

International Search Report issued Nov. 13, 2012 in International (PCT) Application No. PCT/JP2012/075491.
(Continued)

*Primary Examiner* — Max Noori
(74) *Attorney, Agent, or Firm* — Wenderoth, Lind & Ponack, L.L.P.

(57) ABSTRACT

A magnetic load sensor unit for use in a linear motion actuator is provided which is less likely to suffer from hysteresis errors during use while being mounted in the linear motion actuator, and which can reduce the axial length of the linear motion actuator. The magnetic load sensor unit is configured to detect the magnitude of an axial load applied to an object from the linear motion actuator. The sensor unit includes a flange member configured to be deflected when a reaction force to the axial load is received through a thrust bearing, a magnetic target which generates magnetic fields; and a magnetic sensor arranged such that its position relative to the magnetic target changes when the flange member is deflected. The flange member has an axial end surface in which a groove is formed with which rolling elements of the thrust bearing are in rolling contact.

13 Claims, 14 Drawing Sheets

(51) Int. Cl.
*F16D 66/00* (2006.01)
*G01L 5/00* (2006.01)
*G01L 5/12* (2006.01)
*F16C 41/00* (2006.01)
*F16C 19/10* (2006.01)
*F16C 19/52* (2006.01)
*F16C 33/58* (2006.01)
*F16H 25/20* (2006.01)
*F16H 25/22* (2006.01)
*B60T 13/74* (2006.01)
*F16D 55/226* (2006.01)
*F16D 121/24* (2012.01)
*F16D 125/40* (2012.01)
*F16D 125/48* (2012.01)
*F16D 125/50* (2012.01)

(52) U.S. Cl.
CPC .......... *F16C 33/586* (2013.01); *F16C 41/007* (2013.01); *F16D 55/226* (2013.01); *F16D 65/18* (2013.01); *F16D 66/00* (2013.01); *F16H 25/20* (2013.01); *F16H 25/2204* (2013.01); *G01L 5/0009* (2013.01); *G01L 5/12* (2013.01); *F16D 2066/005* (2013.01); *F16D 2121/24* (2013.01); *F16D 2125/40* (2013.01); *F16D 2125/48* (2013.01); *F16D 2125/50* (2013.01); *Y10T 74/18576* (2015.01)

(56) References Cited

U.S. PATENT DOCUMENTS

| | | | | |
|---|---|---|---|---|
| 2002/0012484 | A1* | 1/2002 | Salou | F16D 66/00 384/448 |
| 2004/0187591 | A1 | 9/2004 | Baumann et al. | |
| 2008/0285901 | A1* | 11/2008 | Koike | G01L 5/0023 384/448 |
| 2009/0120184 | A1* | 5/2009 | Ozaki | B60B 27/0005 73/494 |
| 2010/0124389 | A1* | 5/2010 | Norimatsu | B60B 27/0005 384/448 |
| 2010/0175487 | A1 | 7/2010 | Sato | |
| 2014/0191627 | A1* | 7/2014 | Takahashi | G01L 1/122 310/68 B |
| 2014/0262634 | A1* | 9/2014 | Yamasaki | F16D 55/00 188/72.1 |
| 2015/0204736 | A1* | 7/2015 | Masuda | F16D 65/18 73/862.69 |

FOREIGN PATENT DOCUMENTS

| | | |
|---|---|---|
| JP | 08-338461 | 12/1996 |
| JP | 2004-301835 | 10/2004 |
| JP | 2006-057803 | 3/2006 |
| JP | 2007-40459 | 2/2007 |
| JP | 2009-075083 | 4/2009 |
| JP | 2010-265971 | 11/2010 |
| WO | 2011/030839 | 3/2011 |

OTHER PUBLICATIONS

Chinese Office Action issued Mar. 20, 2015 in corresponding Chinese Application No. 201280050219.1 (with partial English translation).

* cited by examiner

MAGNETIC LOAD SENSOR UNIT FOR USE IN A LINEAR MOTION ACTUATOR, AND LINEAR MOTION ACTUATOR

TECHNICAL FIELD

This invention relates to a magnetic load sensor unit for use in a linear motion actuator, and a linear motion actuator including the magnetic load sensor unit.

BACKGROUND ART

Many of today's vehicle brake systems are hydraulic brake systems including a brake disk and friction pads adapted to be pressed against the brake disk by hydraulic cylinders. But with the introduction of new brake control systems such as anti-lock brake systems (ABS), electric brake systems, which require no hydraulic circuits, are receiving attention these days.

Typically, electric brake systems have a linear motion actuator including a rotary shaft to which the rotation of an electric motor is transmitted, and a linear motion mechanism for converting the rotation of the rotary shaft to a linear motion of a linear motion member. The linear motion actuator applies an axial load to a friction pad to press the friction pad against the brake disk, thereby generating a braking force. In order to control the braking force to a desired magnitude, a load sensor unit is mounted in many of such electric brake systems for detecting the magnitude of the axial load applied to the object. For improved response of the electric brake system, it is preferable to use a load sensor unit which can detect a load applied with a minimum possible movement of its moving part or parts.

A load sensor unit for use in a linear motion actuator which satisfies this requirement is disclosed e.g. in the below-identified Patent document 1. This load sensor unit includes an opposed pair of annular presser plates, piezoelectric crystal elements disposed between the presser plates, an insulating plate electrically insulating the piezoelectric crystal elements from one of the opposed pair of presser plates, and a lead wire through which voltage generated by the piezoelectric crystal elements are taken out. When an axial load is applied to this load sensor unit, the piezoelectric crystal elements generate a voltage corresponding to the load applied. It is thus possible to detect the axial load applied by measuring the voltage generated. Since the presser plates are moved very little relative to each other due to deformation of the piezoelectric crystal elements, this sensor unit will never deteriorate response of an electric brake system if mounted in the electric brake system.

But since the load sensor unit disclosed in Patent document 1 is designed such that an axial load applied to the sensor unit directly acts on the piezoelectric crystal elements, if the axial load is an impulsive load or a shear load, one or more of the piezoelectric crystal elements may crack or chip. This load sensor unit is therefore not sufficiently durable.

Under these circumstances, the inventors of the present application attempted to develop an improved load sensor unit which is sufficiently durable, and is capable of detecting loads with a minimum displacement of the moving parts of the sensor unit. As a result, the inventors proposed a magnetic load sensor unit including a flange member configured to be deflected when the reaction force to an axial force applied by the linear motion actuator to an object is applied to the sensor unit, a magnetic target which generates magnetic fields, and a magnetic sensor arranged such that when the flange member is deflected by the reaction force, the position of the magnetic sensor relative to the flange member changes.

Since this magnetic load sensor unit is configured such that the flange member is deflected when the reaction force to an axial force applied by the linear motion actuator to the object is applied to the sensor unit, the relative position between the magnetic target and the magnetic sensor changes due to the deflection of the flange member, and the output signal of the magnetic sensor changes corresponding to the change in relative position, it is possible to detect the magnitude of the axial load based on the output signal of the magnetic sensor. Since this magnetic load sensor unit is configured to detect the above-described axial load based on a change in relative position between the magnetic target and the magnetic sensor, which are kept out of contact with each other, this sensor unit is less likely to malfunction when impulsive loads or shear loads are applied thereto, and is thus sufficiently durable.

PRIOR ART DOCUMENT(S)

Patent Document(s)

Patent document 1: International Publication 2011/030839

SUMMARY OF THE INVENTION

Object of the Invention

Such a load sensor unit is ordinarily mounted in a linear motion actuator such that the reaction force applied to the object is received by the sensor unit through a thrust bearing. Typically, the thrust bearing comprises an axially opposed pair of bearing washers, a plurality of rolling elements disposed between the opposed surfaces of the bearing washers, and a spacer keeping the rolling elements spaced apart from each other. The inventors of the present application discovered that when the sensor unit is used with one of the bearing washers in contact with the axial end surface of the flange member, hysteresis errors could occur in the loads as detected by the sensor unit.

In particular, it was discovered that with the thrust bearing in contact with the axial end surface of the flange member, there could be a difference between the detected value of a first axial load applied from the linear motion actuator which is increasing (thus increasing the degree of deflection of the flange member) and the detected value of a second axial load applied from the linear motion actuator which is decreasing (thus reducing the degree of deflection of the flange member), even if the first and second axial loads are the same, due to frictional force generated between the bearing washer of the thrust bearing and the flange member when the flange member is deflected by the axial load.

Thus, the inventors of the present application discovered that it would be possible to improve the detection accuracy of this type of magnetic load sensor by reducing such hysteresis errors.

If this linear motion actuator is mounted in an electric brake system, the linear motion actuator preferably has as short an axial length as possible to minimize the axial length of the electric brake system, because with this arrangement, parts surrounding the electric brake system (such as a suspension) can be laid out more freely.

An object of the present invention is to provide a load sensor for use in a linear motion actuator which is less likely to suffer from hysteresis errors and which reduces the axial length of the linear motion actuator, when used in the linear motion actuator.

Means for Achieving the Object

In order to achieve this object, the present invention provides a magnetic load sensor unit, for use in a linear motion actuator, configured to detect the magnitude of an axial load applied to an object from the linear motion actuator, wherein the load sensor unit comprises a flange member configured to be deflected when a reaction force to the axial load is received through a thrust bearing, a magnetic target which generates magnetic fields, and a magnetic sensor arranged such that the position of the magnetic sensor relative to the magnetic target changes when the flange member is deflected, wherein the flange member has an axial end surface on which a raceway is formed with which rolling elements of the thrust bearing are in rolling contact.

With this arrangement, since the flange member and the thrust bearing are in rolling contact with each other, no frictional force is generated therebetween when an axial load is applied and the flange member is deflected. This minimizes hysteresis errors. Since one of the conventional two bearing washers of the thrust bearing is not necessary, it is possible to reduce the axial length of the linear motion actuator by the axial thickness of one bearing washer.

If the thrust bearing is a thrust ball bearing including balls as the rolling elements, a groove having a circular arc-shaped section is preferably formed on the axial end surface of the flange member as the raceway.

If the thrust bearing is a thrust roller bearing including cylindrical rollers or needle rollers as the rolling elements, the raceway is preferably in the form of a hardened flat surface formed on the axial end surface of the flange member by heat treatment.

If the thrust bearing is a thrust self-aligning roller bearing including spherical rollers as the rolling elements, the raceway is preferably in the form of a concave surface inclined relative to the direction of the axial load and having a circular arc-shaped section.

Preferably, the magnetic target comprises at least two permanent magnets each magnetized in a direction perpendicular to a relative movement direction in which the position of the magnetic sensor relative to the magnetic target changes, wherein the permanent magnets are arranged such that opposite magnetic poles of the permanent magnets are aligned in the relative movement direction, and wherein the magnetic sensor is located in the vicinity of the boundary between the opposite magnetic poles.

With this arrangement, the magnetic load sensor unit has a directivity such that the output signal of the magnetic sensor changes steeply and sharply when the relative position between the magnetic target and the magnetic sensor changes in the axial direction but does not change so steeply when this relative position changes in a direction other than the axial direction. Thus, the output signal of the magnetic sensor is less likely to be influenced by external vibrations, so that it is possible to detect the magnitude of the axial load applied by the linear motion actuator with stable accuracy.

The magnetic sensor may be in the form of a magnetic resistance element or a magnetic impedance element. But from an economical viewpoint, a Hall IC is preferable. A Hall IC is especially preferable for use in the electric brake applicant because heat-resistant Hall ICs are now commercially available. If neodymium magnets are used as the permanent magnets, the magnets generate strong magnetic fields while taking up little space, so that the resolution of the magnetic load sensor unit improves.

The present invention also provides a linear motion actuator comprising a rotary shaft to which the rotation of an electric motor is to be transmitted, a linear motion member, a linear motion mechanism for converting the rotation of the rotary shaft to an axial movement of the linear motion member, thereby applying an axial load to an object, and a reaction force receiving member which receives a reaction force that acts on the linear motion mechanism when the axial load is applied to the object, wherein the above-described magnetic load sensor unit is used as the reaction force receiving member.

Advantages of the Invention

According to the magnetic load sensor unit, for use in a linear motion actuator, of the present invention, since the flange member and the thrust bearing are in rolling contact with each other, frictional force is less likely to be generated between the flange member and the thrust bearing when the flange member is deflected. This minimizes hysteresis errors. Since one of the conventional two bearing washers of the thrust bearing is not necessary, it is possible to reduce the axial length of the linear motion actuator by the axial thickness of one bearing washer.

BEST MODE FOR EMBODYING THE INVENTION

Figure 1:
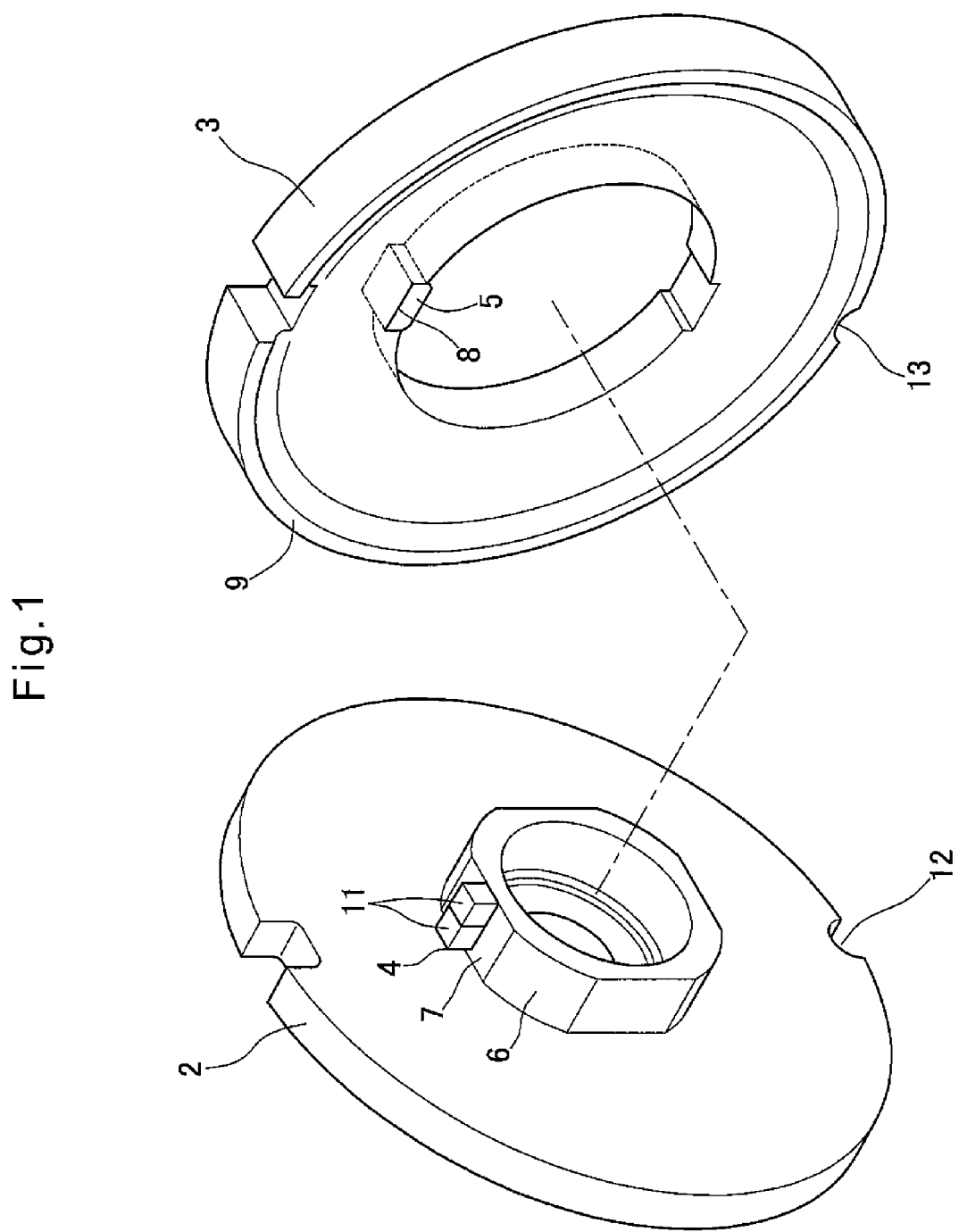
FIG. 1 is an exploded perspective view of a magnetic load sensor unit of a first embodiment according to the present invention.

FIGS. 1 to 4 show a magnetic load sensor unit 1 according to a first embodiment of the present invention. This load sensor unit 1 is used in a linear motion actuator. The magnetic load sensor unit 1 includes a flange member 2 and a support member 3 which are annular plate members axially spaced apart from and axially facing each other, a magnetic target 4 which generates magnetic fields, and a magnetic sensor 5 for detecting the intensity of magnetic fields.

The flange member 2 includes a tubular portion 6 protruding toward the support member 3. The tubular portion 6 has a radially outer surface radially facing the radially inner surface of the support member 3. The magnetic target 4 is fixed to a chamfer 7 formed on the radially outer surface of the tubular portion 6. The magnetic sensor 5 is fixed in a groove 8 formed in the radially inner surface of the support member 3. The flange member 2 and the support member 3 are made of a metal such as iron.

Figure 2:
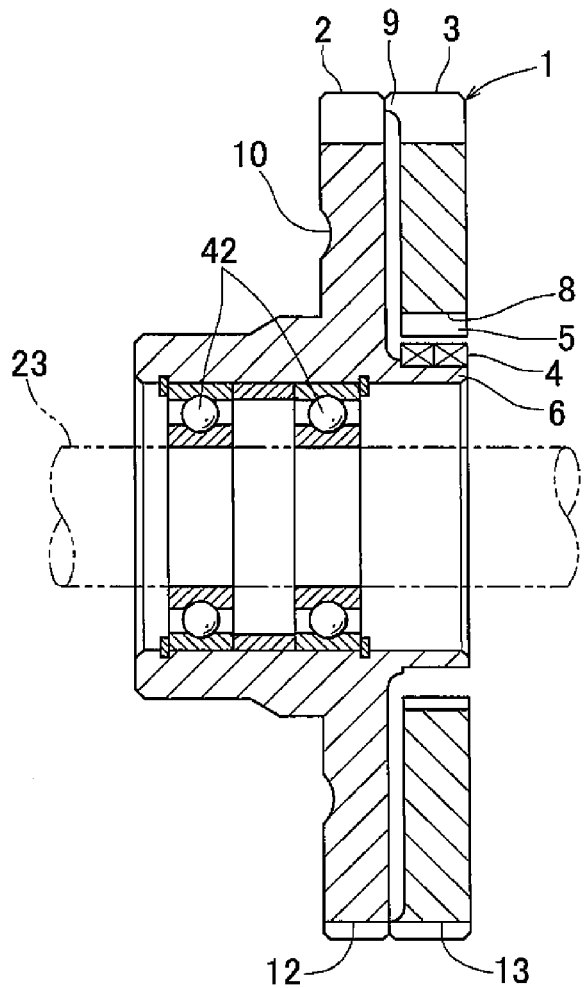
FIG. 2 is a sectional view of the magnetic load sensor unit of FIG. 1.
Figure 3:
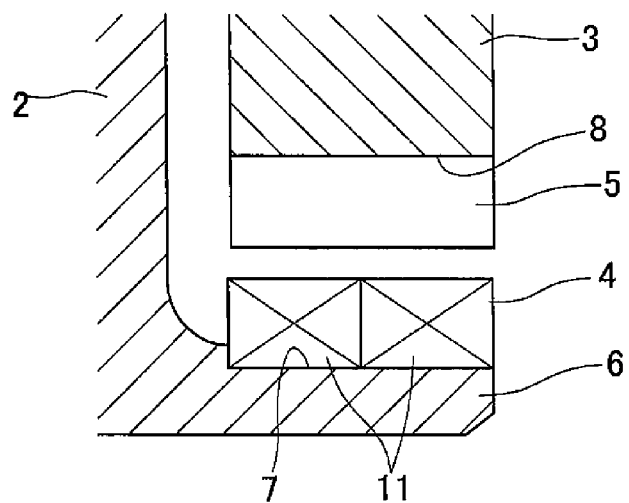
FIG. 3 is an enlarged sectional view of, and around, a magnetic target and a magnetic sensor shown in FIG. 2.
Figure 4:
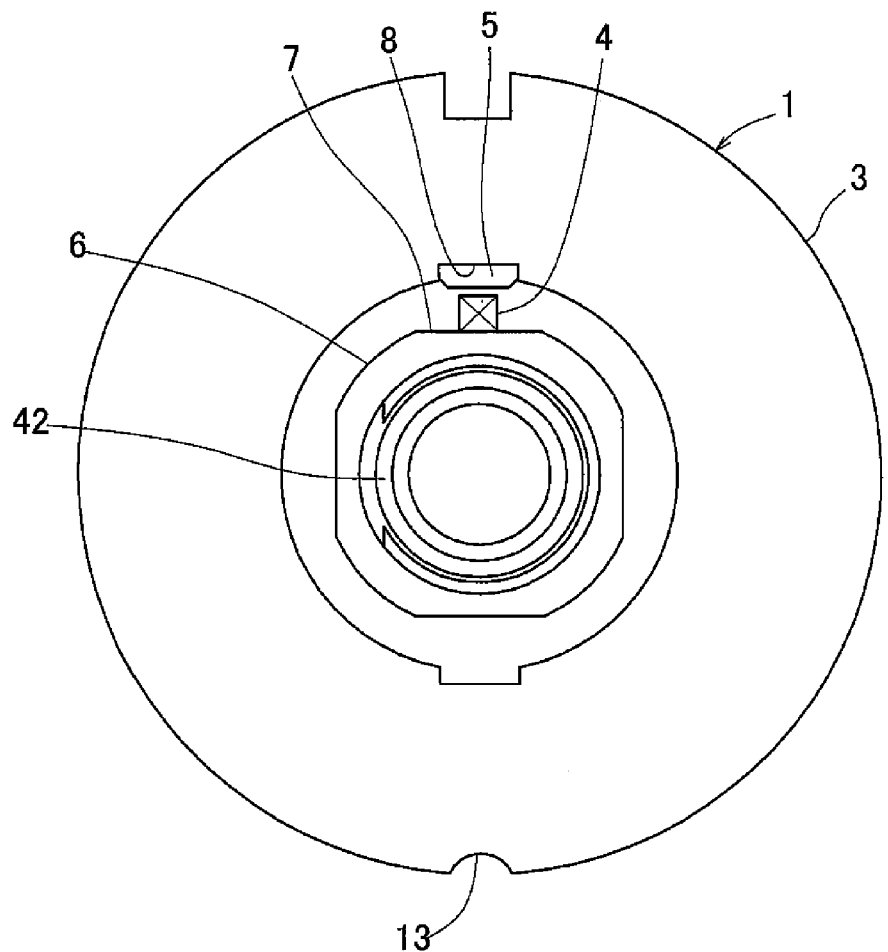
FIG. 4 is a side view of FIG. 2.

The support member 3 has an annular protrusion 9 on its surface facing the flange member 2. The annular protrusion 9 supports the radially outer portion of the flange member 2, thereby defining a gap between the flange member 2 and the support member 3. As shown in FIG. 2, the flange member 2 has a circumferentially continuous groove 10 formed in its surface opposite to its surface facing the support member 3 and having a circular arc-shaped section. The inner surface of the groove 10 is hardened by being subjected to heat treatment such as induction hardening.

The magnetic target 4 comprises two permanent magnets 11 which are radially magnetized such that each magnet 11 has two magnetic poles at its radially inner and outer ends, respectively. The two permanent magnets 11 are arranged adjacent to each other so that two magnetic poles of the respective magnets that are opposite in polarity (i.e. N and S poles) are axially aligned with each other.

If neodymium magnets are used as the permanent magnets 11, the magnets 11 generate strong magnetic fields while taking up little space, so that the resolution of the magnetic load sensor unit 1 improves. But as the permanent magnets 11, samarium-cobalt magnets, Alnico magnets, or ferrite magnets may be used instead. If samarium-cobalt magnets or Alnico magnets are used as the permanent magnets 11, the magnetic fields generated from the permanent magnets are less likely to decrease with a temperature rise of the permanent magnets 11. As the permanent magnets 11, praseodymium magnets or samarium-iron-nitride magnets may also be used.

The magnetic sensor 5 is arranged to face the magnetic target 4 in a direction perpendicular to the axial direction (radial direction in the figures), in the vicinity of the boundary between the adjacent magnetic poles of the two respective permanent magnets 11. As the magnetic sensor 5, a magnetic resistance element (or MR sensor) or a magnetic impedance element (or MI sensor) may be used. But a Hall IC is preferably used, because it is less expensive, and also because highly heat-resistant Hall ICs are now commercially available, so that such heat-resistant Hall ICs can be advantageously used in electric brake systems.

Figure 10:
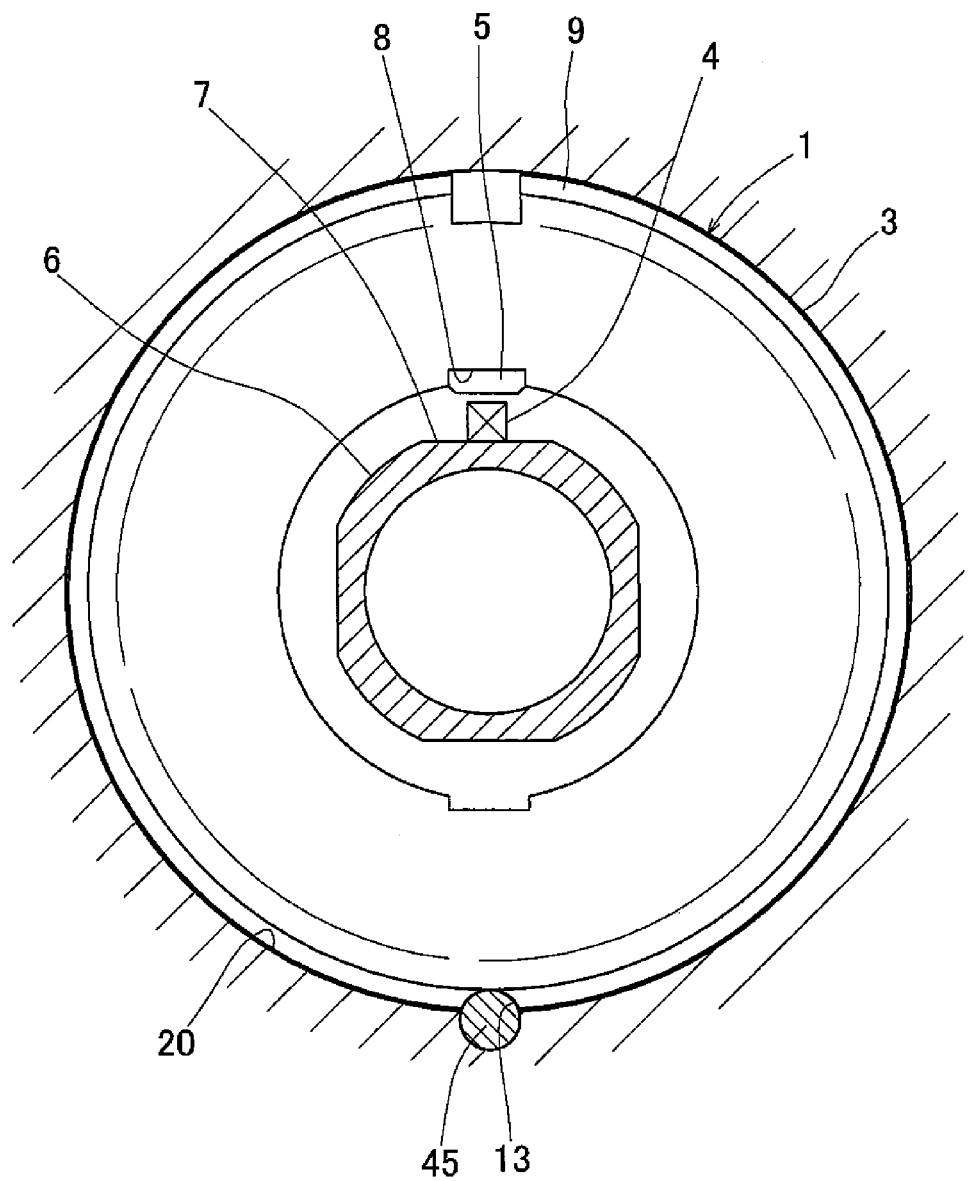
FIG. 10 is a sectional view taken along line X-X of FIG. 7.

Positioning grooves 12 and 13 having a circular arc-shaped section are formed in the outer peripheries of the flange member 2 and the support member 3, respectively, at such positions that when a key member 45 (shown in FIGS. 7 and 10) is inserted into both grooves 12 and 13, the flange member 2 and the support member 3 are circumferentially positioned relative to each other such that the circumferential position of the magnetic target 4 coincides with that of the magnetic sensor 5.

When an axial load is applied to the flange member 2 of this magnetic load sensor unit 1 that tends to push the flange member 2 toward the support member 3, the flange member 2 is deflected in the axial direction about the outer peripheral portion of the flange member 2, corresponding to the axial load. The deflection of the flange member 2 changes the relative position between the magnetic target 4 and the magnetic sensor 5, which in turn changes the output signal of the magnetic sensor 5. Thus, by grasping the relationship between the magnitude of the axial load applied to the flange member 2 and the output signal of the magnetic sensor 5 beforehand, it is possible to detect the magnitude of the axial load applied to the flange member 2 based on the output signal of the magnetic sensor 5.

Figure 5:
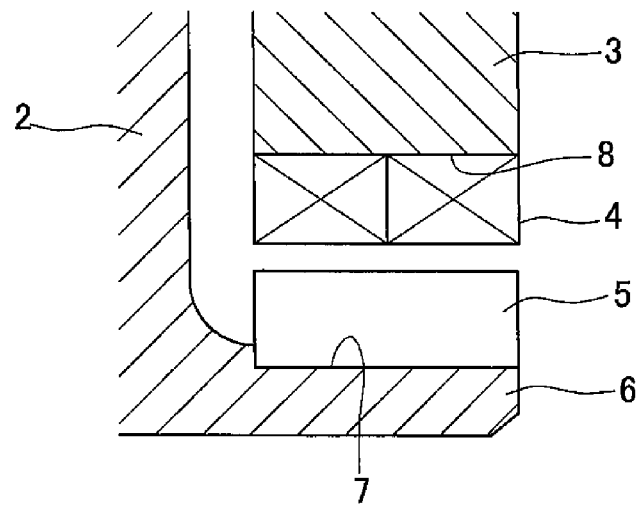
FIG. 5 is an enlarged sectional view of the same portion as FIG. 3, of a sensor unit of which the magnetic target and the magnetic sensor of FIG. 3 are arranged in a different manner from FIG. 3.

In FIGS. 1 to 4, the magnetic target 4 is fixed to the flange member 2, while the magnetic sensor 5 is fixed to the support member 3. But the magnetic target 4 and the magnetic sensor 5 may be arranged conversely. In particular, as shown in FIG. 5, the magnetic sensor 5 may be fixed to the radially outer surface of the tubular portion 6 of the flange member 2, while the magnetic target 4 may be fixed to the radially inner surface of the support member 3.

FIGS. 6 to 10 show an electric brake system including a linear motion actuator 14 in which the above-described magnetic load sensor unit 1 is mounted.

The electric brake system includes a brake disk 15 configured to rotate together with a wheel, a caliper body 19 having opposed pieces 16 and 17 facing each other with the brake disk 15 disposed therebetween and coupled together by a bridge 18, and a pair of right and left friction pads 21 and 22. The linear motion actuator 14 is mounted in a mounting hole 20 open to the surface of the opposed piece 17 facing the brake disk 15.

The friction pad 22 is provided between the opposed piece 17 and the brake disk 15, and is supported by a pad pin (not shown) mounted to the caliper body 19 so as to be movable in the axial direction of the brake disk 15. The other friction pad 21 is mounted to the other opposed piece 16. The caliper body 19 is slidable in the axial direction of the brake disk 15.

Figure 7:
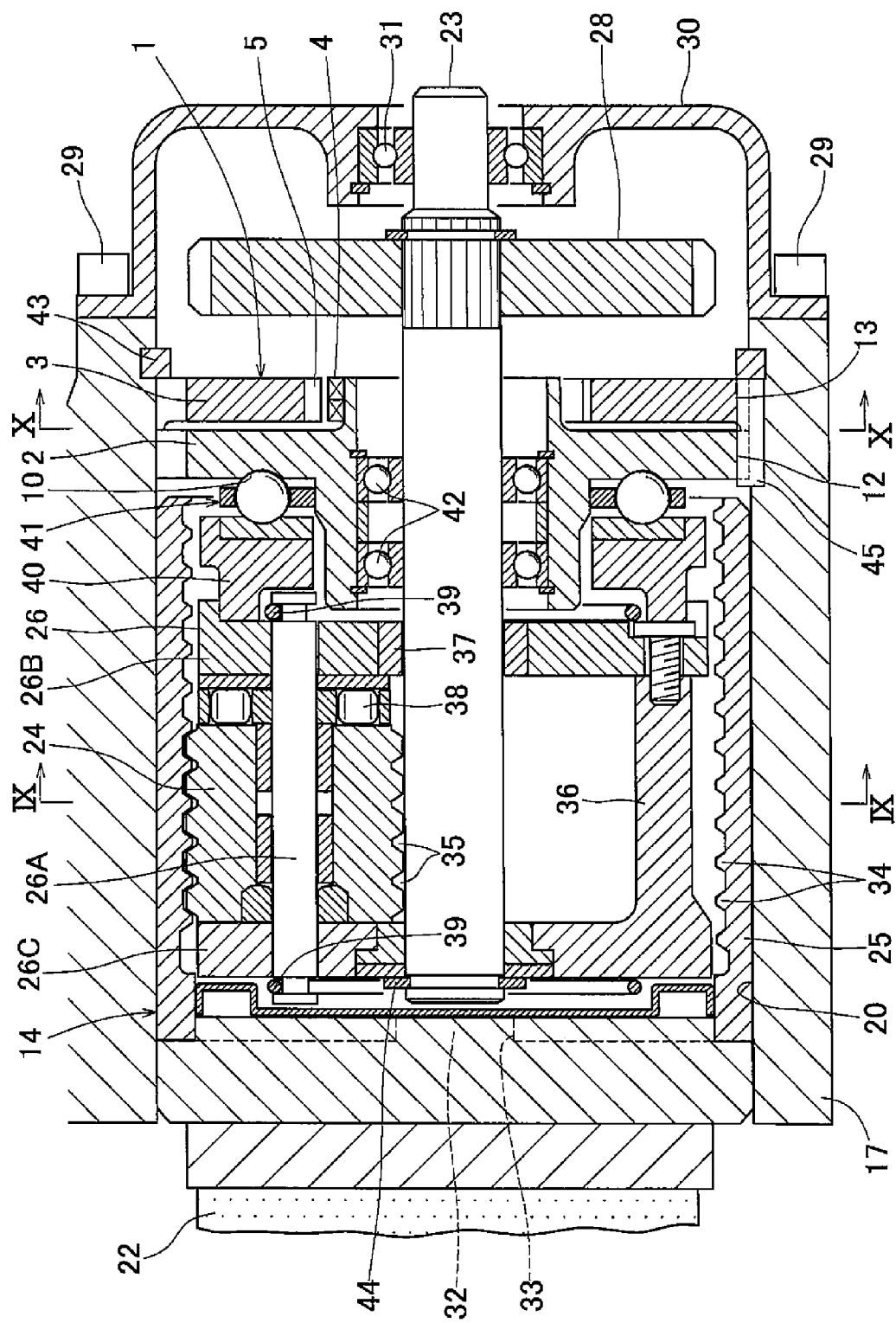
FIG. 7 is an enlarged sectional view of a portion of FIG. 6 where there is the linear motion actuator.

As shown in FIG. 7, the linear motion actuator 14 includes a rotary shaft 23, a plurality of planetary rollers 24 kept in rolling contact with the cylindrical surface on the outer periphery of the rotary shaft 23, an outer ring member 25 surrounding the planetary rollers 24, and a carrier 26 supporting the planetary rollers 24 so as to be rotatable about their respective axes while revolving around the rotary shaft 23. The magnetic load sensor unit 1 is disposed axially rearwardly of the outer ring member 25.

Figure 6:
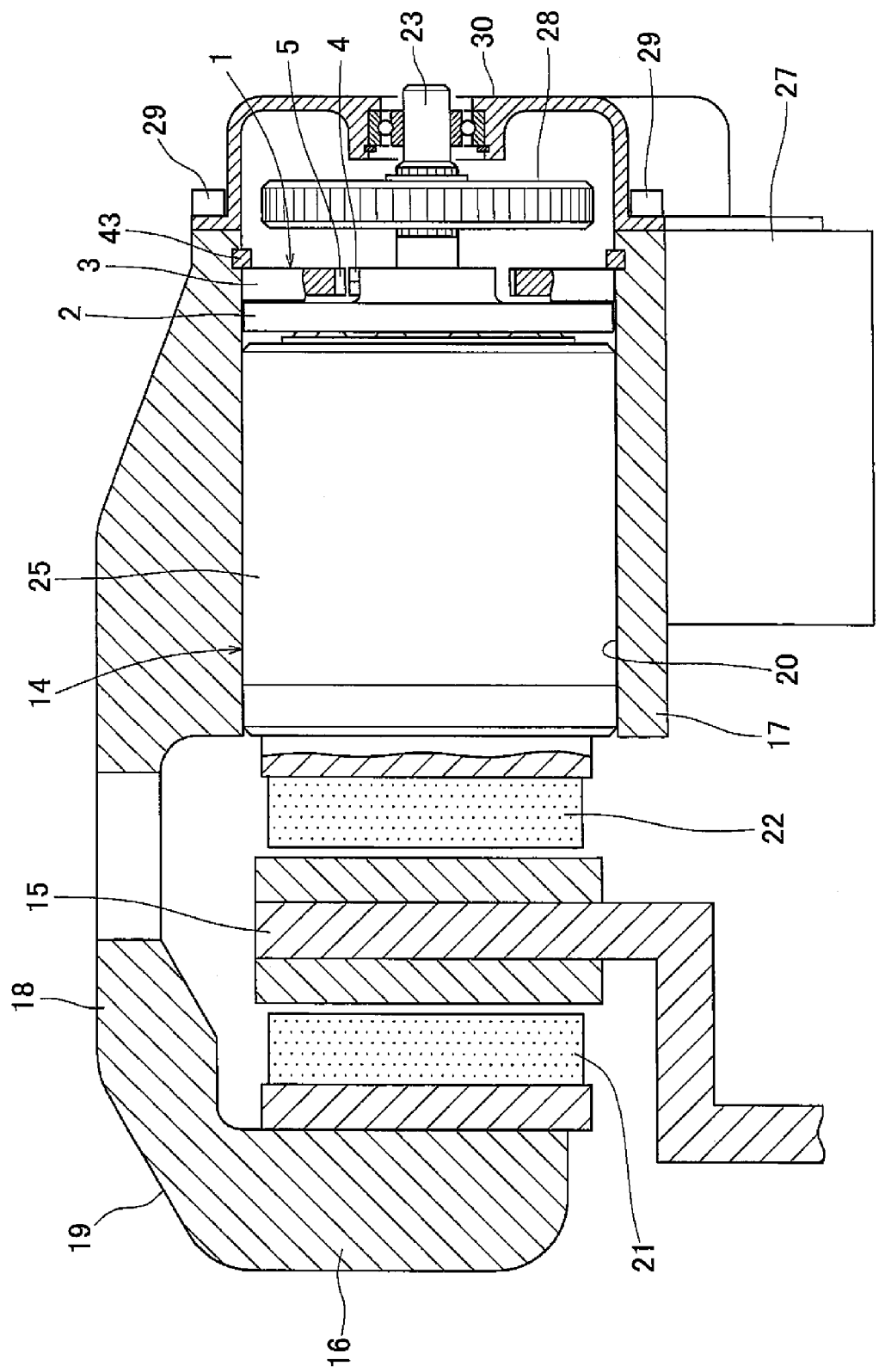
FIG. 6 is a sectional view of an electric brake system including a linear motion actuator in which the magnetic load sensor unit of FIG. 1 is mounted.

The rotary shaft 23 is rotated by an electric motor 27 shown in FIG. 6 through a gear 28. The rotary shaft 23 is received in the mounting hole 20, which axially extends through the opposed piece 17, with one end of the rotary shaft 23 protruding from the opening of the mounting hole 20 at the axially rear end of the mounting hole 20. The gear 28 is rotationally fixed to this protruding end of the rotary shaft 23 by means of splines. The gear 28 is covered by a lid 30 fixed in position by bolts 29 to close the opening of the mounting hole 20 at its axially rear end. A bearing 31 is mounted in the lid 30 which rotatably supports the rotary shaft 23.

Figure 9:
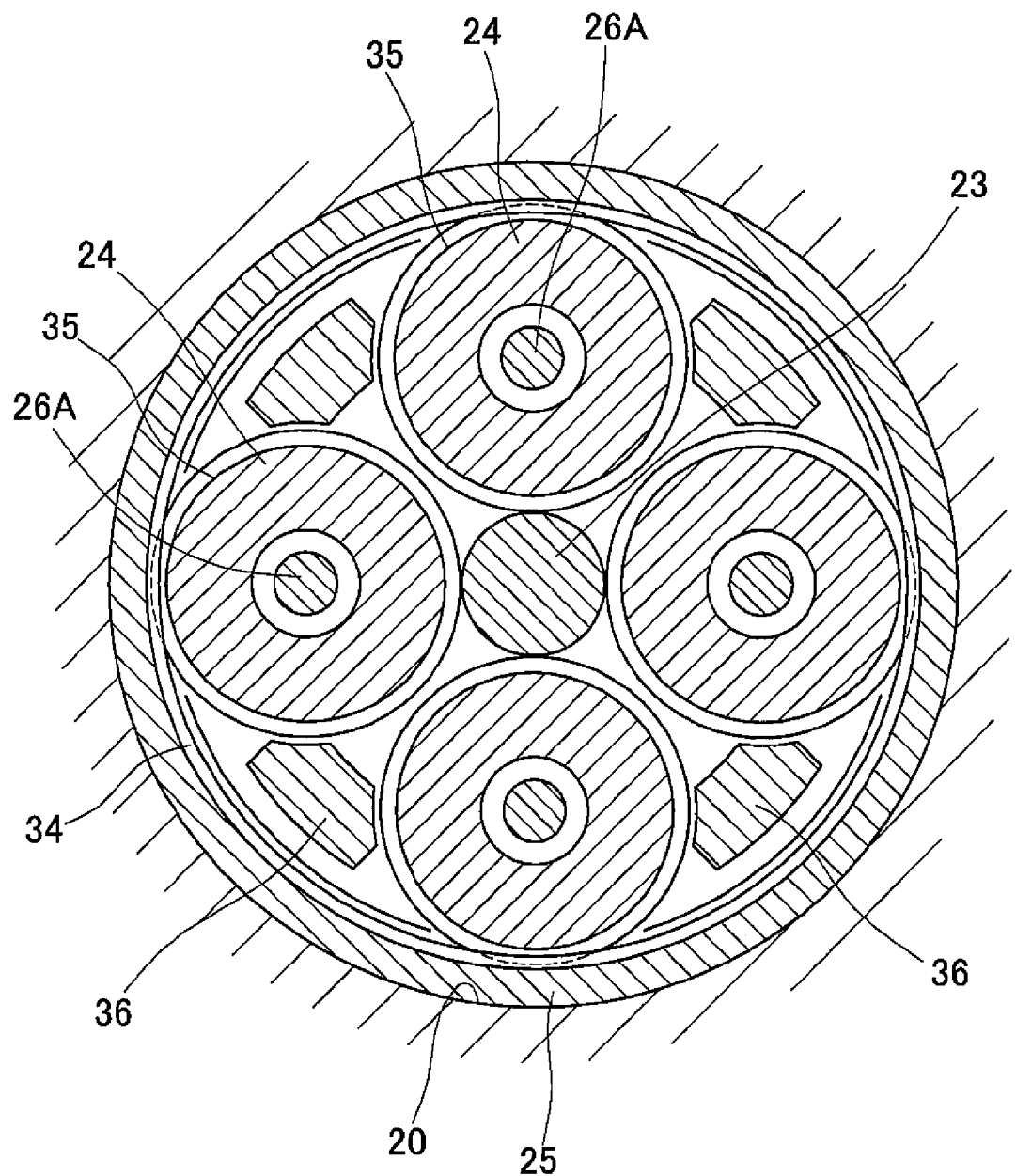
FIG. 9 is a sectional view taken along line IX-IX of FIG. 7.

As shown in FIG. 9, the planetary rollers 24 are kept in rolling contact with the cylindrical surface on the outer periphery of the rotary shaft 23 such that when the rotary shaft 23 rotates, the planetary rollers 24 also rotate due to friction between the planetary rollers 24 and the rotary shaft 23. The planetary rollers 24 are circumferentially spaced apart from each other.

As shown in FIG. 7, the outer ring member 25 is mounted in the mounting hole 20 formed in the opposed piece 17 of the caliper r body 19, and is supported by the wall of the mounting hole 20 so as to be slidable in the axial direction. The outer ring member 25 has in its axial front end an engaging recess 33 in which an engaging protrusion 32 formed on the back surface of the friction pad 22 is engaged. Due to the engagement of the engaging protrusion 32 in the engaging recess 33, the outer ring member 25 is prevented from rotating relative to the caliper body 19.

A helical rib 34 is formed on the inner periphery of the outer ring member 25, while the planetary rollers 24 are each formed with circumferential grooves 35 on the outer periphery thereof in which the helical rib 34 is engaged. Thus, when the planetary rollers 24 rotate, the outer ring member 25 is moved in the axial direction, with the helical rib 34 guided by the circumferential grooves 35. Instead of the circumferential grooves 35, of which the lead angle is zero, a helical groove having a different lead angle from the helical rib 34 may be formed on the outer periphery of each planetary roller 24.

The carrier 26 includes carrier pins 26A rotatably supporting the respective planetary rollers 24, an annular carrier plate 26C keeping the axial front ends of the carrier pins 26A circumferentially spaced apart from each other, and an annular carrier body 26B keeping the axial rear ends of the carrier pins 26A circumferentially spaced apart from each other. The carrier plate 26C and the carrier body 26B axially face each other with the planetary rollers 24 therebetween, and are coupled together through coupling rods 36 extending between the respective circumferentially adjacent pairs of planetary rollers 24.

The carrier body 26B is supported by the rotary shaft 23 through a slide bearing 37 so as to be rotatable relative to the rotary shaft 23. Thrust bearings 38 are mounted between the respective planetary rollers 24 and the carrier body 26B to prevent transmission of rotation of the respective planetary rollers 24 about their axes to the carrier body 26B.

Radially shrinkable ring springs 39 are wrapped around the circumferentially spaced apart carrier pins 26A, biasing the carrier pins 26A radially inwardly. The outer peripheries of the planetary rollers 24 are thus pressed against the outer periphery of the rotary shaft 23 under the biasing force of the radially shrinkable ring springs 39, thus preventing slippage between the rotary shaft 23 and the respective planetary rollers 24. In order to distribute the biasing force of the radially shrinkable ring springs 39 over the entire axial lengths of the respective planetary rollers 24, the radially shrinkable ring springs 39 are wrapped around, respectively, the front ends and the rear ends of the carrier pins 26A.

The magnetic load sensor unit 1 is fitted in the mounting hole 20 with the support member 3 positioned axially rearwardly of the flange member 2. Between the carrier 26 and the magnetic load sensor unit 1, there are provided a spacer 40 rotatable together with the carrier 26, and a thrust bearing 41 which is disposed between the spacer 40 and the magnetic load sensor unit 1 and through which axial loads are transmitted. Rolling bearings 42 are fitted in the flange member 2 and rotatably support the rotary shaft 23.

A snap ring 43 is fitted in the inner wall of the mounting hole 20, and engages the radially outer edge of the support member 3, preventing axial rearward movement of the magnetic load sensor unit 1. The magnetic load sensor unit 1 axially supports the carrier body 26B through the spacer 40 and the thrust bearing 41, thereby preventing axial rearward movement of the carrier 26. A snap ring 44 is fitted on the rotary shaft 23 at its axial front end to prevent axial forward movement of the carrier 26. As a result, the carrier 26 is prevented from both axially forward and axially rearward movements, so that the planetary rollers 24, held in position by the carrier 26, are also prevented from axial movement.

Figure 8:
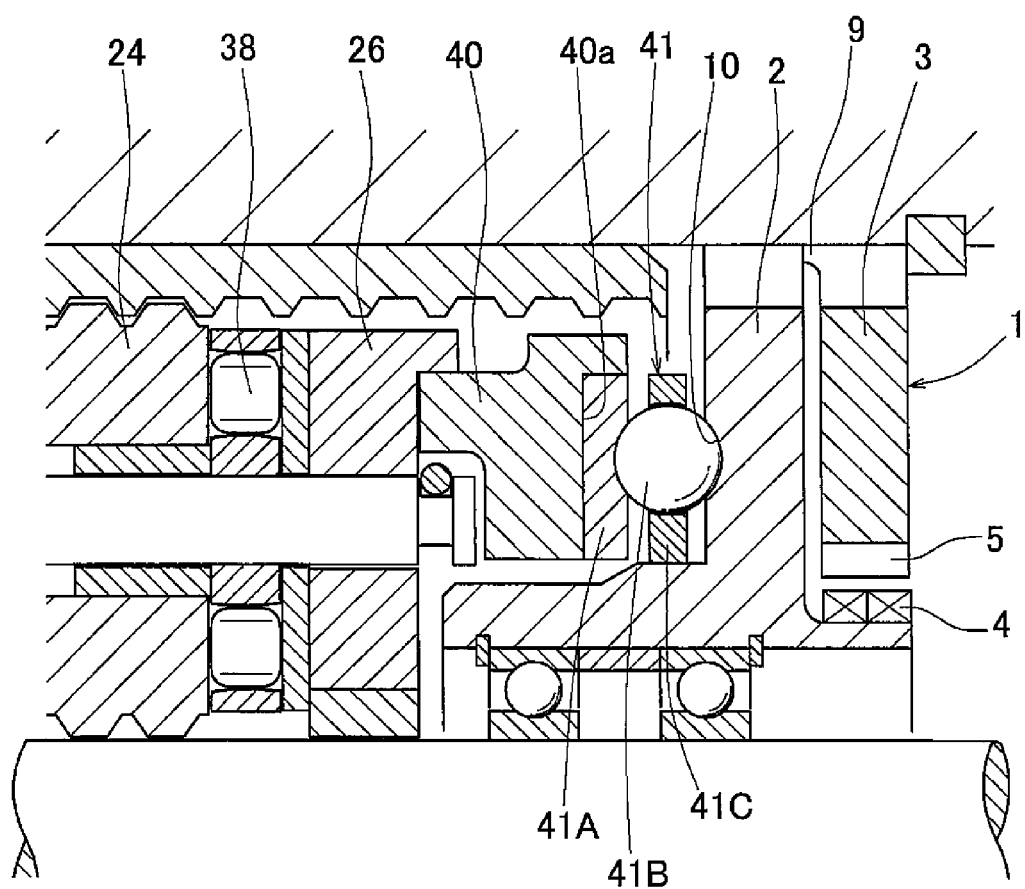
FIG. 8 is an enlarged sectional view of a portion of FIG. 7 where there is the magnetic load sensor unit.

As shown in FIG. 8, the thrust bearing 41 comprises a bearing washer 41A fitted in a bearing fitting groove 40a formed in the surface of the spacer 40 facing the flange member 2, rolling elements 41B mounted between the bearing washer 41A and the flange member 2 so as to be circumferentially spaced apart from each other, and a retainer 41C keeping the rolling elements 41B spaced apart from each other. The rolling elements 41B are balls, so that the thrust bearing 41 is a thrust ball bearing. The rolling elements 41B are kept in rolling contact with a groove 10 directly formed in the axial end surface of the flange member 2 and having a circular arc-shaped section. The groove 10 thus serves as a raceway of the thrust bearing 41.

As shown in FIG. 7, the key member 45 is fitted in the positioning grooves 12 and 13 formed in the respective outer peripheries of the flange member 2 and the support member 3 while being engaged in the wall of the mounting hole 20 (see FIG. 10), thereby circumferentially positioning the flange member 2 and the support member 3 relative to each other.

The operation of the linear motion actuator 14 is now described.

When the electric motor 27 is energized, and the rotary shaft 23 is rotated by the motor 27, the planetary rollers 24 revolve around the rotary shaft 23 while rotating about the respective carrier pins 26A. This causes relative movement between the outer ring member 25 and the planetary rollers 24 due to engagement of the helical rib 34 in the circumferential grooves 35. But since the planetary rollers 24, as well as the carrier 26, are prevented from axial movement, only the outer ring member 25 is actually moved in the axial direction with the planetary rollers 24 kept stationary in the axial direction. Thus, the linear motion actuator 14 is effective to covert the rotation of the rotary shaft 23, when driven by the electric motor 27, to the axial movement of the outer ring member 25, thereby applying an axial load to the friction pad 22 from the outer ring member 25. Under this axial load, the friction pad 22 is pressed against the brake disk 15e, generating a braking force.

When an axial load is applied to the friction pad 22 from the outer ring member 25, an axially rearward reaction force acts on the outer ring member 25. This reaction force is transmitted through the planetary rollers 24, carrier 26, spacer 40 and thrust bearing 41, and received by the magnetic load sensor unit 1. The reaction force thus deflects the flange member 2 of the magnetic load sensor unit 1 axially rearward, changing the relative position between the magnetic target 4 and the magnetic sensor 5. This in turn changes the output signal of the magnetic sensor 5. Thus, it is possible to detect the magnitude of the axial load based on the output signal of the magnetic sensor 5. By performing feedback control of the braking force generated by this electric brake system based on the output signal of the magnetic sensor 5, it is possible to control the load with high accuracy.

The magnetic load sensor unit 1 detects the axial load not based on local strain of the flange member 2 but based on the amount of deformation of the flange member 2. The axial load thus detected is therefore less likely to be influenced by a change in temperature or a variation in temperature distribution, of the linear motion actuator, so that it is possible to detect the magnitude of the axial load of the linear motion actuator 14 with high accuracy.

When an axial load is applied to the friction pad 22, mainly shear loads act on the flange member 2, while mainly compressive loads act on the support member 3. The magnetic target 4 is displaced by the shear loads that act on the flange member 2, while the magnetic sensor 5 scarcely moves under the compressive loads that act on the support member 3. This makes it possible to detect the axial load based on the relative displacement between the magnetic target 4 and the magnetic sensor 5.

When an axial load is applied to the friction pad 22 by the linear motion actuator 14, the distance by which the relative position between the magnetic target 4 and the magnetic sensor 5 changes is extremely small. For example, if an axial load of 30 kN is applied to the friction pad by the linear motion actuator 14, the relative position between the magnetic target 4 and the magnetic sensor 5 changes only about 0.1 mm in the axial direction. But in this magnetic load sensor unit 1, since the plurality of permanent magnets 11 are arranged such that their opposite magnetic poles are aligned in the direction in which the relative position between the magnetic target 4 and the magnetic sensor 5 changes, and further the magnetic sensor 5 is positioned adjacent to the boundary between the adjacent opposite magnetic poles, the output signal of the magnetic sensor 5 changes sharply and steeply when the relative position between the magnetic target 4 and the magnetic sensor 5 changes. This makes it possible to detect the distance by which the relative position between the magnetic target 4 and the magnet sensor 5 changes with high accuracy.

The magnetic load sensor unit 1 has a directivity such that the output signal of the magnetic sensor 5 changes steeply and sharply when the relative position between the magnetic target 4 and the magnetic sensor 5 changes in the axial direction but does not change so steeply when this relative position changes in a direction other than the axial direction. Thus, the output signal of the magnetic sensor 5 is less likely to be influenced by external vibrations, so that it is possible to detect the magnitude of the axial load applied by the linear motion actuator 14 with stable accuracy.

Since the flange member 2 of this magnetic load sensor unit 1 is in rolling contact with the thrust bearing 41, when the flange member 2 is deflected under an axial load, the deflection of the flange member 2 is less likely to result in the generation of frictional force between the flange member 2 and the thrust bearing 41. This in turn reduces hysteresis errors, and thus eliminates errors between detected values while the load (and thus the degree of deflection of the flange member 2) is increasing and decreasing.

Since the thrust bearing 41 of this magnetic load sensor unit 1 needs no bearing race on the side of the flange member 2, the axial length of the linear motion actuator 14 and thus the electric brake system can be made short by the axial thickness of this raceway. Thus, when such an electric brake system is mounted in a vehicle, parts surrounding the electric brake system (such as a suspension) can be laid out more freely.

Since the magnetic target 4 and the magnetic sensor 5 are kept out of contact with each other, and an axial load is detected based on a change in relative position between the magnetic target 4 and the magnetic sensor 5, this magnetic load sensor unit 1 is less likely to malfunction even if impact loads or shear loads are applied to the sensor unit 1, so that its durability is high.

One way to detect the axial load applied by the linear motion actuator 14 is to estimate the axial load applied to the friction pad 22 based on the axial displacement of the outer ring member 25 when the friction pad 22 is axially forwardly pressed by the outer ring member 25. But for this purpose, a separate sensor is necessary to measure fluctuations in the home position of the outer ring member 25 due e.g. to wear of the friction pad 22. Such a sensor complicates the structure of the entire system. In contrast, since the magnetic load sensor unit 1 is configured to detect the axial load applied to the friction pad 22 based on the degree of deflection of the flange member 2 due to the reaction force when the friction pad 22 is pressed axially forward by the outer ring member 25, fluctuations in the home position of the outer ring member 25 due e.g. to wear of the friction pad 22 do not influence the axial load detected by the magnetic load sensor unit 1. Thus, no sensor is necessary to measure the home position of the outer ring member 25, so that the entire system is simpler in structure.

Figure 11:
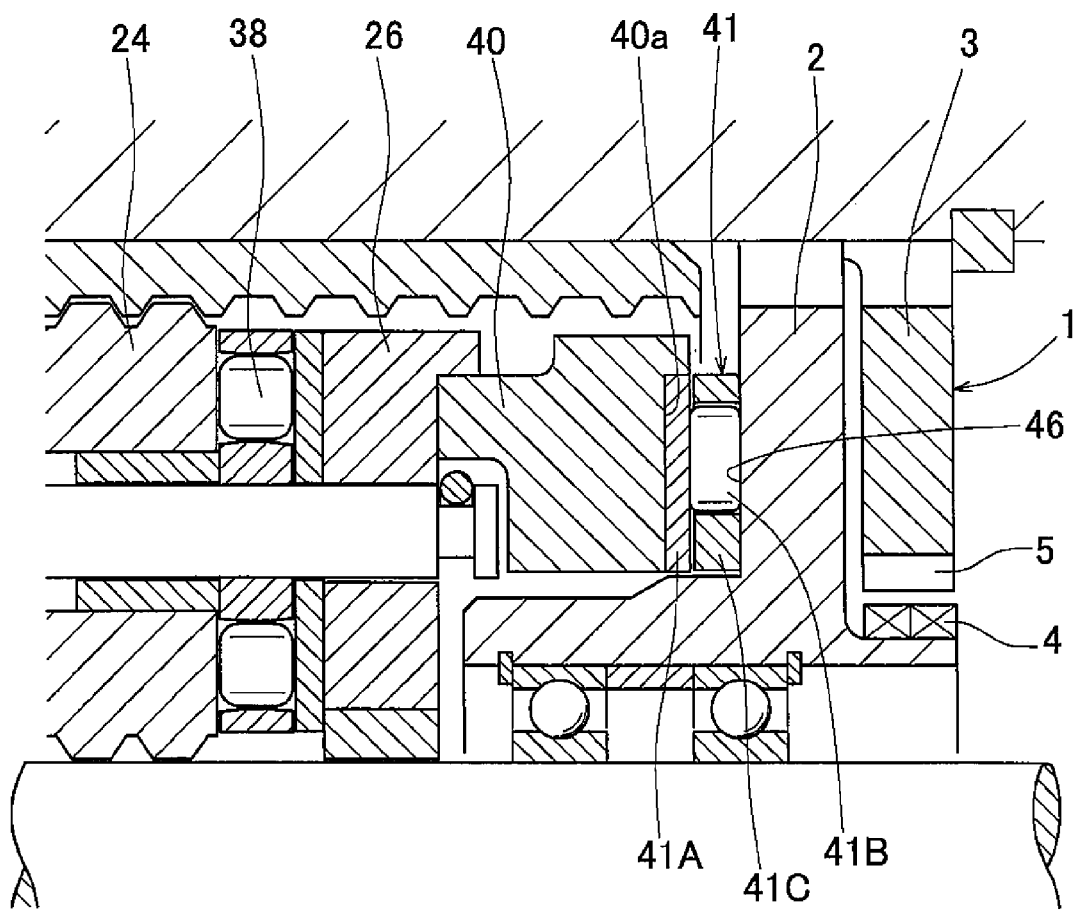
FIG. 11 is an enlarged sectional view of a magnetic load sensor unit that is different from that shown in FIG. 8.

In the above embodiment, the rolling elements 41B of the thrust bearing 41 are balls. But a different thrust bearing 41 may be used. For example, as shown in FIG. 11, a thrust roller bearing including cylindrical rollers or needle rollers as the rolling elements 41B may be used. In FIG. 11, on the side of the flange member 2 opposite to its side facing the support member 3, a circumferentially continuous flat surface 46 is formed which is hardened by heat treatment (such as induction hardening) and which serves as a raceway of the thrust bearing 41.

Figure 12:
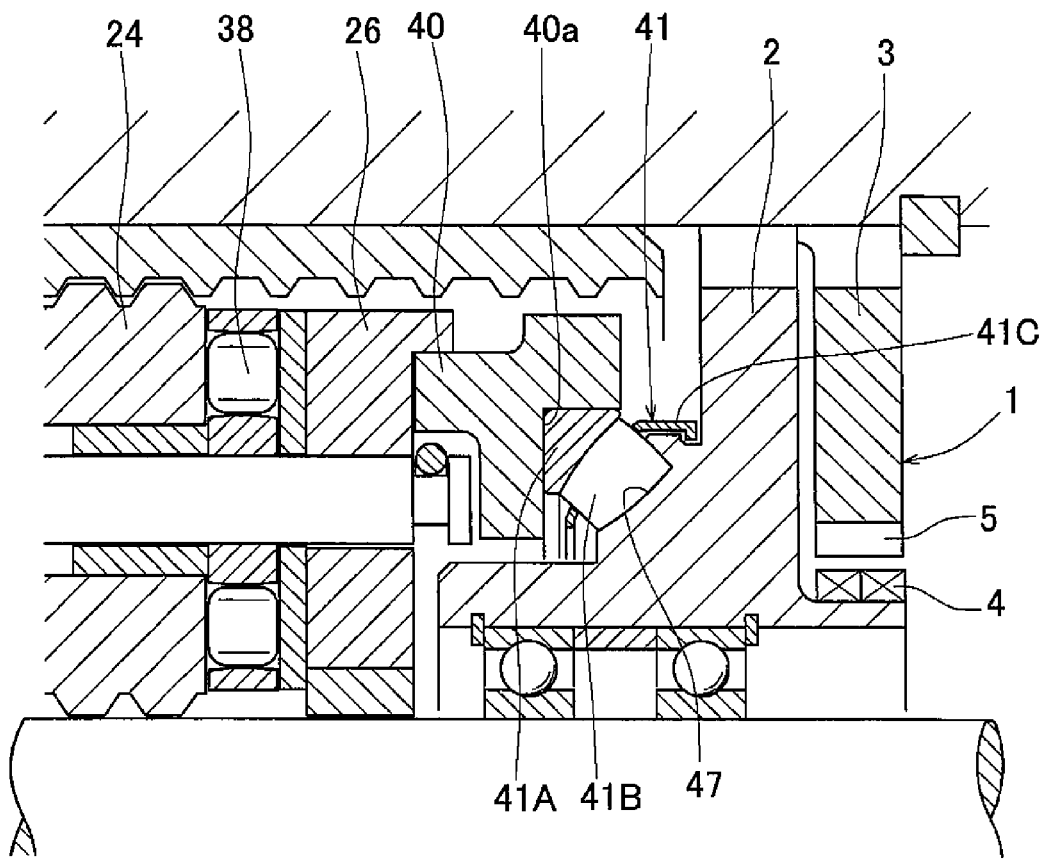
FIG. 12 is an enlarged sectional view of another magnetic load sensor unit that is different from that shown in FIG. 8.

Also, as shown in FIG. 12, a thrust self-aligning roller bearing including spherical rollers as the rolling elements 41B may be used instead, too. In FIG. 12, on the side of the flange member 2 opposite to its side facing the support member 3, a circumferentially continuous concave surface 47 is formed which is inclined relative to the direction of axial loads and which has a circular arc-shaped section. The concave surface 47 serves as a raceway of the thrust bearing 41. The thrust self-aligning roller bearing serves to absorb any error in parallelism between the spacer 41 and the flange member 2, thereby allowing the flange member 2 to be always deflected uniformly, which makes it possible to detect loads stably and accurately.

In the above embodiment, the linear motion mechanism for converting the rotation of the rotary shaft 23 to a linear motion of the linear motion member (the outer ring member 25 in this embodiment) is a planetary roller mechanism comprising the plurality of planetary rollers 24 kept in rolling contact with the cylindrical surface on the outer periphery of the rotary shaft 23, the carrier 26 supporting the planetary rollers 24 so as to be rotatable about their respective axes while revolving around the rotary shaft, and prevented from axial movement, and the outer ring member 25 surrounding the planetary rollers 24, in which the outer ring member 25 has the helical rib 34 engaged in the helical grooves or circumferential grooves 35 formed in the outer peripheries of the respective planetary rollers 24. But the present invention is applicable to a linear motion actuator including a different linear motion mechanism too.

Figure 13:
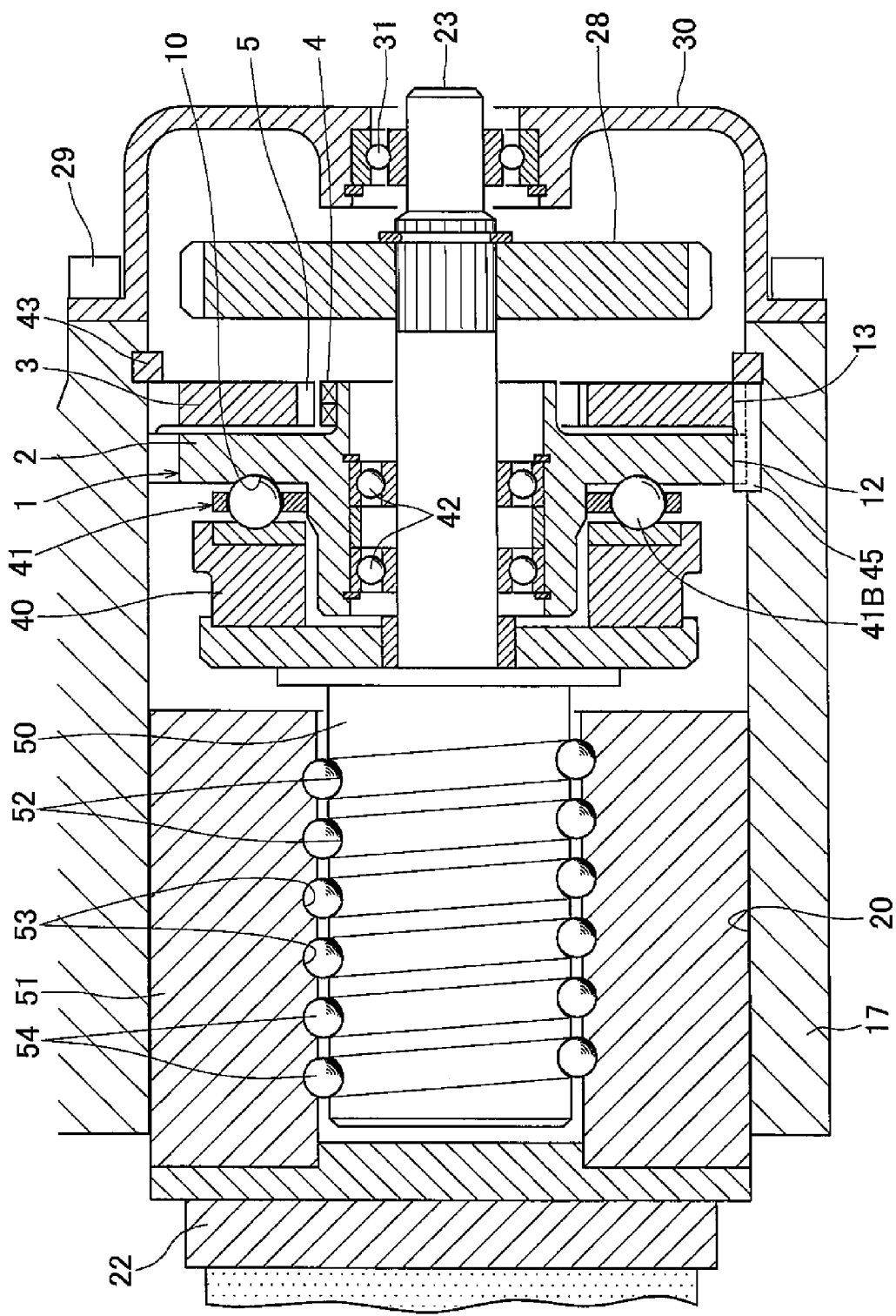
FIG. 13 is an enlarged sectional view of a linear motion actuator including a linear motion mechanism in the form of a ball-screw mechanism.

By way of example thereof, FIG. 13 shows a linear motion actuator including a ball-screw mechanism as the linear motion mechanism. In the following description of FIG. 13, elements corresponding to those of the above embodiment are denoted by identical numerals and their description is omitted.

In FIG. 13, the linear motion actuator comprises a rotary shaft 23, a threaded shaft 50 integral with the rotary shaft 23, a nut 51 surrounding the threaded shaft 50, a plurality of balls 54 disposed between a thread groove 52 formed in the outer periphery of the threaded shaft 50 and a thread groove 53 formed in the inner periphery of the nut 51, a return tube (not shown) through which the balls 54 are returned from the terminal end to the starting end, of the thread groove 53 of the nut 51, and the magnetic load sensor unit 1, which is provided axially rearward of the nut 51.

The nut 51 is received in the mounting hole 20 formed in the opposed piece 17 of the caliper body 19 so as to be rotationally fixed and axially slidable, relative to the caliper body 19. A spacer 40 is provided at the axially rear end of the threaded shaft 50 so as to rotate together with the threaded shaft 50. The spacer 40 is supported by the magnetic load sensor unit 1 through the thrust bearing 41. The magnetic load sensor unit 1 axially supports the nut 51 through the spacer 40, the thrust bearing 41 and the threaded shaft 50, thereby restricting axial rearward movement of the nut 51.

This linear motion actuator is configured such that when the rotary shaft 23 is rotated, the threaded shaft 50 and the nut 51 are rotated relative to each other such that the nut 51 is moved axially forward, thereby applying an axial load to the friction pad 22. At this time, an axial rearward reaction force is applied to the threaded shaft 50. The reaction force is transmitted through the spacer 40 and the thrust bearing 41, and received by the magnetic load sensor unit 1. The reaction force thus deflects the flange member 2 of the magnetic load sensor unit 1 axially rearward, changing the relative position between the magnetic target 4 and the magnetic sensor 5. This in turn changes the output signal of the magnetic sensor 5 corresponding to the magnitude of the axial load applied to the friction pad 22, in the same manner as in the above embodiment. Thus, it is possible to detect the pressing force applied to the friction pad 22 based on the output signal of the magnetic sensor 5.

Figure 14:
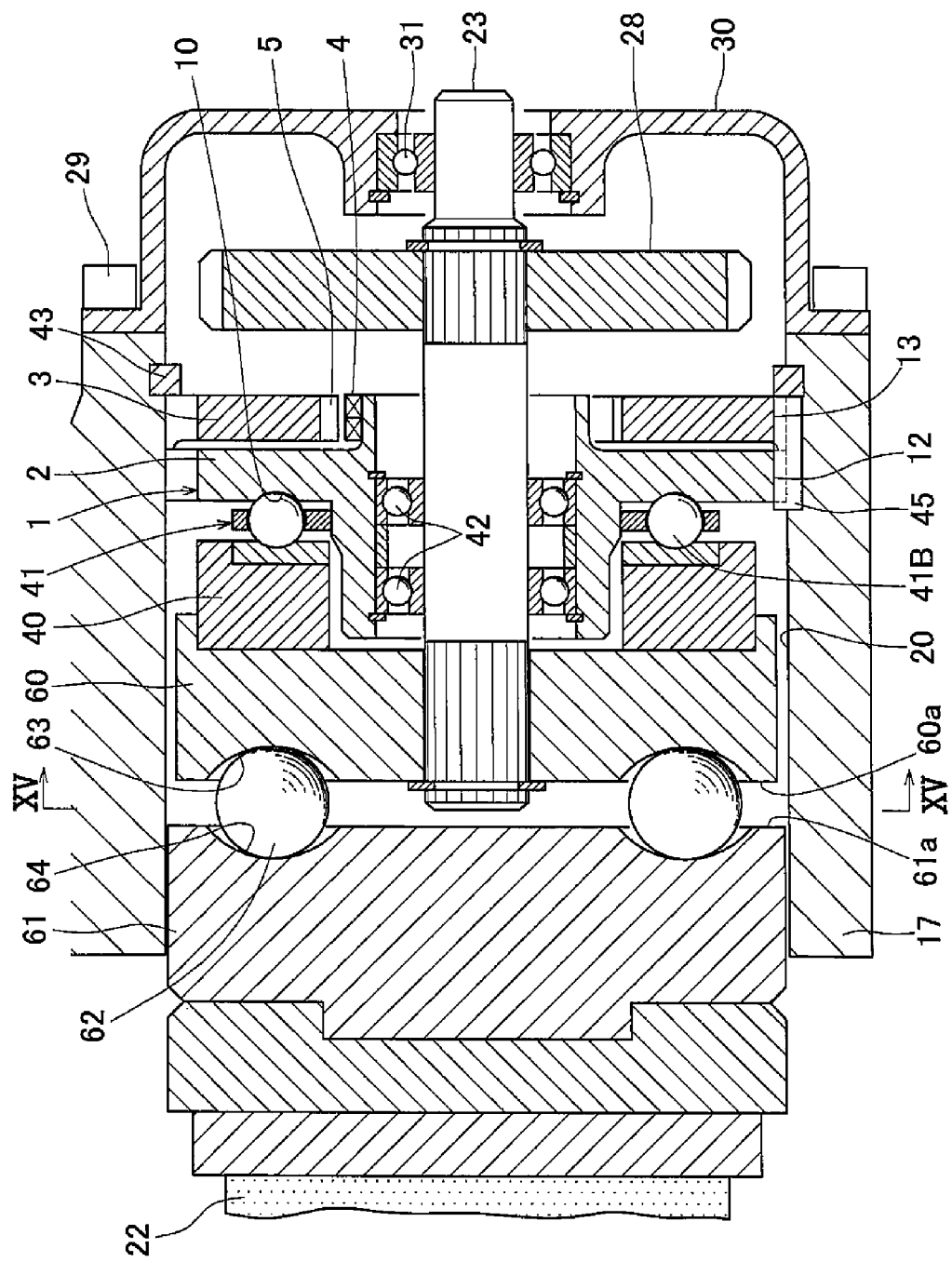
FIG. 14 is an enlarged sectional view of a linear motion actuator including a linear motion mechanism in the form of a ball-ramp mechanism.

FIG. 14 shows a linear motion actuator including a ball-ramp mechanism as the linear motion mechanism.

The linear motion actuator of FIG. 14 includes a rotary shaft 23, a rotary disk 60 rotationally fixed to the outer periphery of the rotary shaft 23, a linear motion disk 61 provided axially forward of the rotary disk 60 and facing the rotary disk 60, a plurality of balls 62 sandwiched between the rotary disk 60 and the linear motion disk 61, and the magnetic load sensor unit 1, which is provided axially rearward of the linear motion disk 61.

The linear motion disk 61 is received in the mounting hole 20 formed in the opposed piece 17 of the caliper body 19 so as to be rotationally fixed and axially slidable, relative to the caliper body 19. A spacer 40 is provided at the axially rear end of the rotary disk 60 so as to rotate together with the rotary disk 60. The spacer 40 is supported by the magnetic load sensor unit 1 through the thrust bearing 41. The magnetic load sensor unit 1 axially supports the rotary disk 60 through the spacer 40 and the thrust bearing 41, thereby restricting axial rearward movement of the rotary disk 60.

Figure 15:
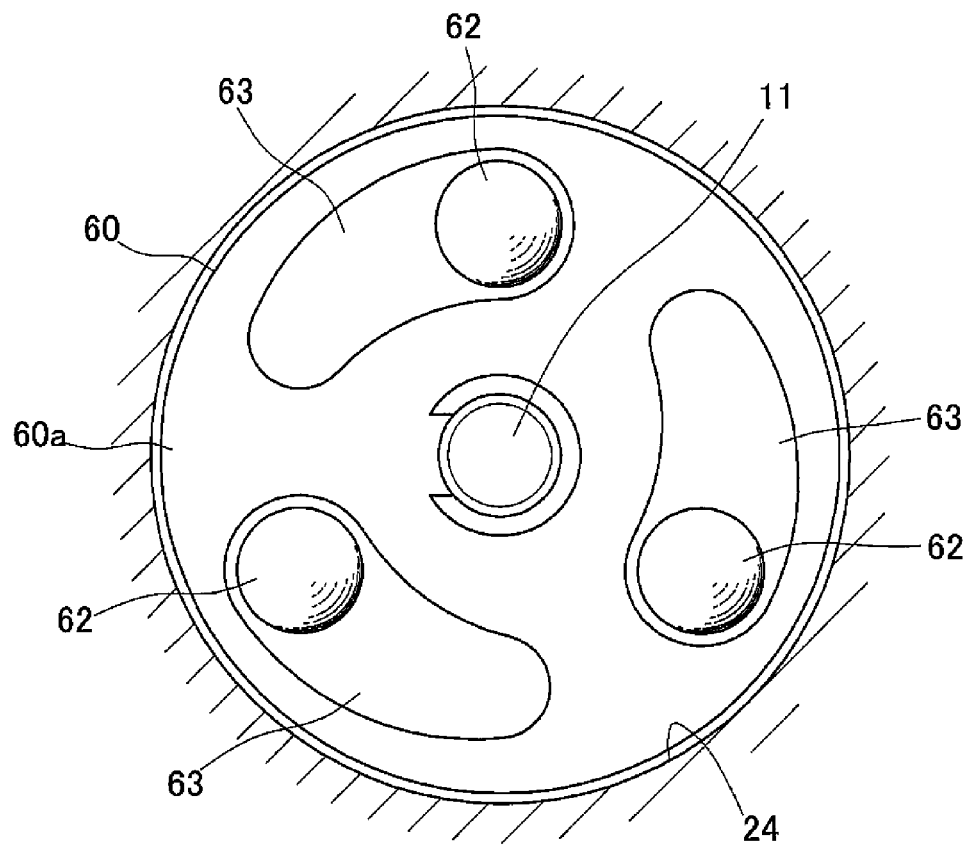
FIG. 15 is a sectional view taken along line XV-XV of FIG. 14.
Figure 16:
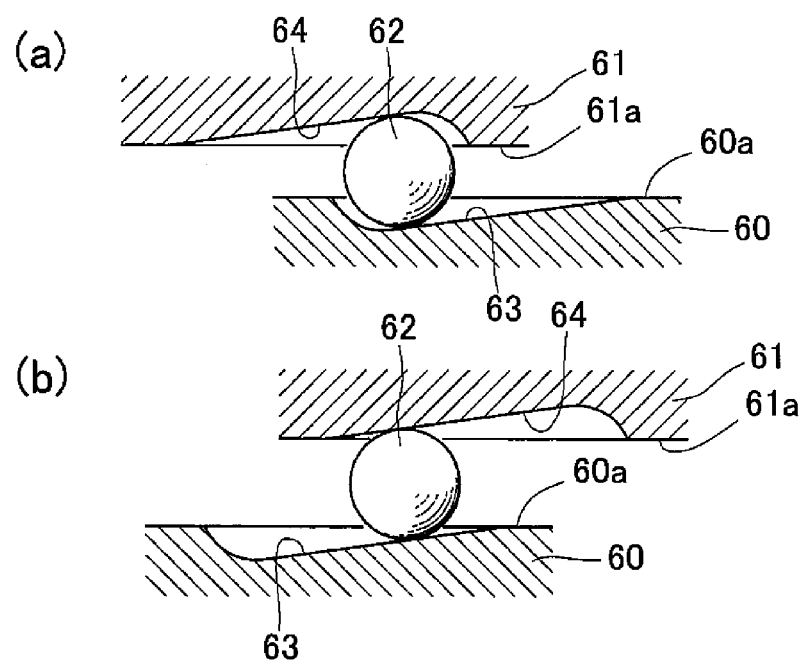
FIG. 16(a) shows the relationship between a ball and inclined grooves shown in FIG. 14.
FIG. 16(b) shows a state in which a rotary disk and a linear motion disk are rotated relative to each other, and the distance between the disks has increased, from the state of FIG. 16(a).

As shown in FIGS. 14 and 15, inclined grooves 63 are formed in the opposed surface 60a of the rotary disk 60 facing the linear motion disk 61 such that the depth of each inclined groove 63 gradually decreases in one of the opposite circumferential directions, while inclined grooves 64 are formed in the opposed surface 61a of the linear motion disk 61 facing the rotary disk 60 such that the depth of each inclined groove 64 gradually decreases in the other of the opposite circumferential directions. As shown in FIG. 16(a), the balls 62 are each received between the corresponding pair of the inclined grooves 63 of the rotary disk 60 and the inclined grooves 64 of the linear motion disk 61. As shown in FIG. 16(b), when the linear motion disk 61 rotates relative to the rotary disk 60, the balls 62 roll in the respective pairs of inclined grooves 63 and 64 such that the distance between the rotary disk 60 and the linear motion disk 61 increases.

This linear motion actuator is configured such that when the rotary shaft 23 is rotated, the linear motion disk 61 and the rotary disk 60 are rotated relative to each other such that the linear motion disk 61 is moved axially forward, thereby applying an axial load to the friction pad 22. At this time, an axial rearward reaction force is applied to the rotary disk 60. The reaction force is transmitted through the spacer 40 and the thrust bearing 41, and received by the magnetic load sensor unit 1. The reaction force thus deflects the flange member 2 of the magnetic load sensor unit 1 axially rearward, changing the relative position between the magnetic target 4 and the magnetic sensor 5. This in turn changes the output signal of the magnetic sensor 5 corresponding to the magnitude of the axial load applied to the friction pad 22, in the same manner as in the above embodiment. Thus, it is possible to detect the pressing force applied to the friction pad 22 based on the output signal of the magnetic sensor 5.

Figure 17:
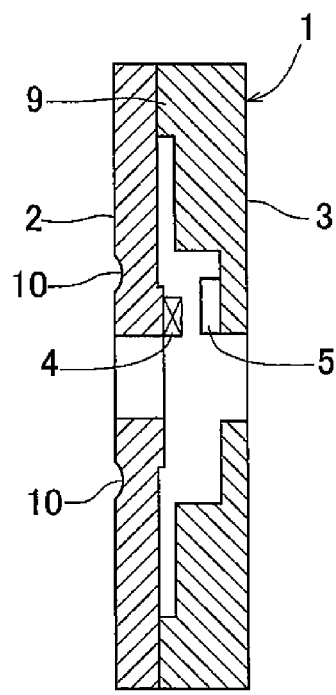
FIG. 17 is a sectional view of a magnetic load sensor unit of which the magnetic sensor and the magnetic target shown in FIG. 2 are arranged in a different manner.

In the above embodiment, in order to accurately detect the distance by which the magnetic target 4 and the magnetic sensor 5 move relative to each other, the magnets of the magnetic target 4 are arranged such that the magnetic target 4 is magnetized in a direction perpendicular to the direction in which the magnetic target 4 and the magnetic sensor 5 move relative to each other. Alternatively, as shown in FIG. 17, the magnetic target 4 may be arranged such that the magnetic target 4 is magnetized in the direction parallel to the direction in which the magnetic target 4 and the magnetic sensor 5 move relative to each other, with the magnetic sensor 5 disposed in the vicinity of the magnetic target 4.

Figure 18:
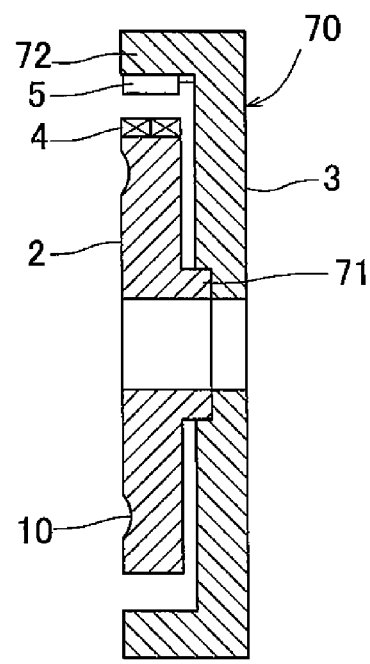
FIG. 18 is a sectional view of a magnetic load sensor unit of a second embodiment according to the present invention.

FIG. 18 shows a magnetic load sensor unit 70 of a second embodiment according to the present invention. Elements corresponding to those of the first embodiment are denoted by identical numerals, and their description is omitted.

The flange member 2 has an annular protrusion 71 on its surface facing the support member 3. The annular protrusion 71 supports a radially inner portion of the support member 3, thereby defining a gap between the flange member 2 and the support member 3. The support member 3 includes a tubular portion 72 protruding toward the flange member 2. The tubular portion 72 has a radially inner surface radially facing the radially outer surface of the flange member 2. The magnetic sensor 5 is fixed to the radially inner surface of the tubular portion 72, while the magnetic target 4 is fixed to the radially outer surface of the flange member 2.

When an axial load is applied to the flange member 2 of this magnetic load sensor unit 1 that tends to push the flange member 2 toward the support member 3, the flange member 2 is deflected in the axial direction about the inner peripheral portion of the flange member 2, and the support member 3 is also deflected in the axial direction about the inner peripheral portion of the support member 3, corresponding to the axial load. The deflections of both of the members 2 and 3 change the relative position between the magnetic target 4 and the magnetic sensor 5, which in turn changes the output signal of the magnetic sensor 5. Thus, by grasping the relationship between the magnitude of the axial load applied to the flange member 2 and the output signal of the magnetic sensor 5 beforehand, it is possible to detect the magnitude of the axial load applied to the flange member 2 based on the output signal of the magnetic sensor 5.

With this arrangement, when an axial load is applied to the flange member 2, not only the flange member 2 but also the support member 3 is deflected. Since the magnetic target 4 and the magnetic sensor 5 are moved relative to each other due to deflections of both members 2 and 3, the load applied can be detected with higher resolution than in the arrangement of the first embodiment.

DESCRIPTION OF THE REFERENCE NUMERALS

1. Magnetic load sensor unit
2. Flange member
4. Magnetic target
5. Magnetic sensor
10. Groove
11. Permanent magnet
14. Linear motion actuator
22. Friction pad
23. Rotary shaft
25. Outer ring member
27. Electric motor
41. Thrust bearing
41B. Rolling element
46. Flat surface
47. Concave surface
51. Nut
61. Linear motion disk

What is claimed is:

1. A magnetic load sensor arrangement, for use in a linear motion actuator to detect a magnitude of an axial load applied to an object from the linear motion actuator, the magnetic load sensor arrangement including:
    a magnetic load sensor unit, and
    a thrust bearing configured to receive a reaction force to the axial load,
    wherein said magnetic load sensor unit comprises:
    a flange member configured to receive the reaction force to the axial load through the thrust bearing and configured to be deflected by the reaction force;
    a magnetic target which generates magnetic fields; and
    a magnetic sensor arranged such that a position of the magnetic sensor relative to the magnetic target changes when the flange member is deflected;
    wherein the flange member has an axial end surface on which a raceway is formed with which rolling elements of the thrust bearing are in rolling contact, and
    wherein the magnetic target comprises at least two permanent magnets each magnetized in a direction perpendicular to a relative movement direction in which the position of the magnetic sensor relative to the magnetic target changes, wherein the at least two permanent magnets are arranged such that opposite magnetic poles of the at least two permanent magnets are aligned in the relative movement direction, and wherein the magnetic sensor is located in a vicinity of a boundary between the opposite magnetic poles.

2. The magnetic load sensor arrangement of claim 1, wherein the thrust bearing is a thrust ball bearing including balls as the rolling elements, and wherein the raceway comprises a groove having a circular arc-shaped section.

3. The magnetic load sensor arrangement of claim 1, wherein the thrust bearing is a thrust roller bearing including cylindrical rollers or needle rollers as the rolling elements, and wherein the raceway comprises a hardened flat surface hardened by heat treatment.

4. The magnetic load sensor arrangement of claim 1, wherein the thrust bearing is a thrust self-aligning roller bearing including spherical rollers as the rolling elements, and wherein the raceway comprises a concave surface inclined relative to a direction of the axial load and having a circular arc-shaped section.

5. The magnetic load sensor arrangement of claim 1, wherein the magnetic sensor comprises an IC element.

6. The magnetic load sensor arrangement of claim 1, wherein the magnetic sensor comprises a magnetic resistance element.

7. The magnetic load sensor arrangement of claim 1, wherein the magnetic sensor comprises a magnetic impedance element.

8. The magnetic load sensor arrangement of claim 1, wherein the at least two permanent magnets are neodymium magnets.

9. A linear motion actuator comprising a rotary shaft to which a rotation of an electric motor is to be transmitted, a linear motion member, a linear motion mechanism for converting a rotation of the rotary shaft to an axial movement of the linear motion member, thereby applying an axial load to an object, and a reaction force receiving member which receives a reaction force that acts on the linear motion mechanism when the axial load is applied to the object, wherein the reaction force receiving member comprises the magnetic load sensor arrangement of claim 1.

10. The magnetic load sensor arrangement of claim 5, wherein the IC element comprises a Hall IC.

11. The linear motion actuator of claim 9, wherein the thrust bearing is a thrust ball bearing including balls as the rolling elements, and wherein the raceway comprises a groove having a circular arc-shaped section.

12. The linear motion actuator of claim 9, wherein the thrust bearing is a thrust roller bearing including cylindrical rollers or needle rollers as the rolling elements, and wherein the raceway comprises a hardened flat surface hardened by heat treatment.

13. The linear motion actuator of claim 9, wherein the thrust bearing is a thrust self-aligning roller bearing including spherical rollers as the rolling elements, and wherein the raceway comprises a concave surface inclined relative to a direction of the axial load and having a circular arc-shaped section.

* * * * *